United States Patent [19]

Tokisue et al.

[11] Patent Number: 5,077,888
[45] Date of Patent: Jan. 7, 1992

[54] ARTICLE ASSEMBLING METHOD AND DEVICE

[75] Inventors: Hiromitsu Tokisue; Hiroshi Inouye, both of Ibaraki, Japan

[73] Assignee: Hitachi, Ltd., Tokyo, Japan

[21] Appl. No.: 480,943

[22] Filed: Feb. 16, 1990

[30] Foreign Application Priority Data

Feb. 17, 1989 [JP] Japan .................................. 1-36179

[51] Int. Cl.$^5$ .............................................. B29J 15/06
[52] U.S. Cl. ...................................... 29/467; 294/64.3
[58] Field of Search ................ 29/464, 467; 294/64.3

[56] References Cited

U.S. PATENT DOCUMENTS

| | | | |
|---|---|---|---|
| 4,735,449 | 4/1988 | Kuma | 294/64.3 |
| 4,773,687 | 9/1988 | Bush et al. | 294/64.3 |

FOREIGN PATENT DOCUMENTS

| | | | |
|---|---|---|---|
| 0211236 | 9/1987 | Japan | 294/64.3 |
| 2191467 | 12/1987 | United Kingdom | |

OTHER PUBLICATIONS

IBM Tech. Disc. Bulletin, vol. 22, No. 8A, Jan. 1980, "Self Centering Non Contact Pick-Up" R.D. Colis, p. 3370.
IBM Tech. Disc. Bulletin, vol. 19, No. 12, May 1977, "Handling App. for Flexible Mag Disks" Parkes et al., p. 4491.
Mechanical Engineering Technology—"Automatic Assembly of Components by the Jet Method" by V. A. Yakhimovich-Russian vol. 50, No. 6.
IBM Technical Disclosure Bulletin, vol. 25, No. 11A, Apr. 1983, "Compliant Positionint Mechanism" L. H. Thompson.
Japanese Abstract, "Method and Device for Loading Industrial Robot with Parts" Appl. No. 60-23253.
Fujitsu-Schientific and Technical Journal, vol. 22, No. 3, 9/1986, Kawasaki Jp, pp. 188-197, "Variable Compliance Robot with Tactile Sensory Feedback".

*Primary Examiner*—Irene Cuda
*Attorney, Agent, or Firm*—Antonelli, Terry, Stout & Kraus

[57] ABSTRACT

A device for mounting magnetic discs on a spindle of a magnetic disc file assembly has a disc transfer mechanism provided with a disc supporting surface operative to support a disc in non-contacting and relatively movable relationship with a fluid film formed therebetween. The thus supported disc is axialy aligned, by a positioning mechanism, with the spindle and then released into engagement with the spindle. The floating support of the disc allows the disc to be moved relative to the disc supporting surface first into alignment and then into engagement with the spindle without any mechanical contact and friction between the disc supporting surface and the disc to thereby prevent the production of dusty material otherwise produced by mechanical contact between the disc and the supporting surface.

16 Claims, 16 Drawing Sheets

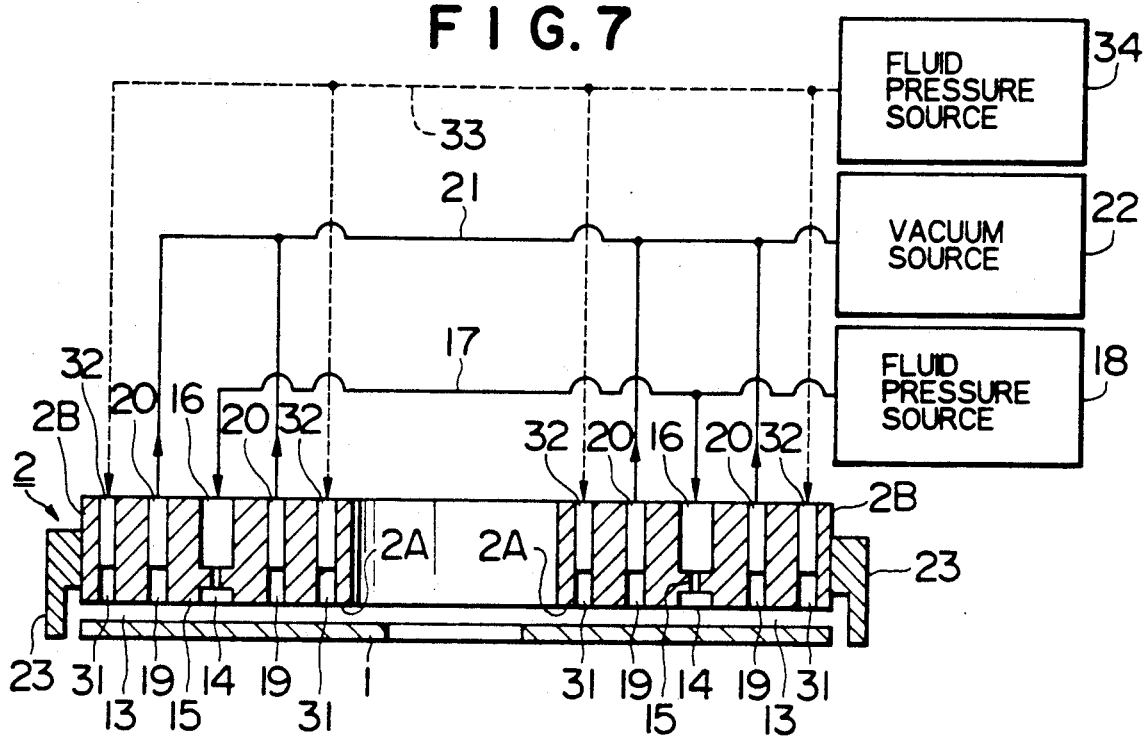
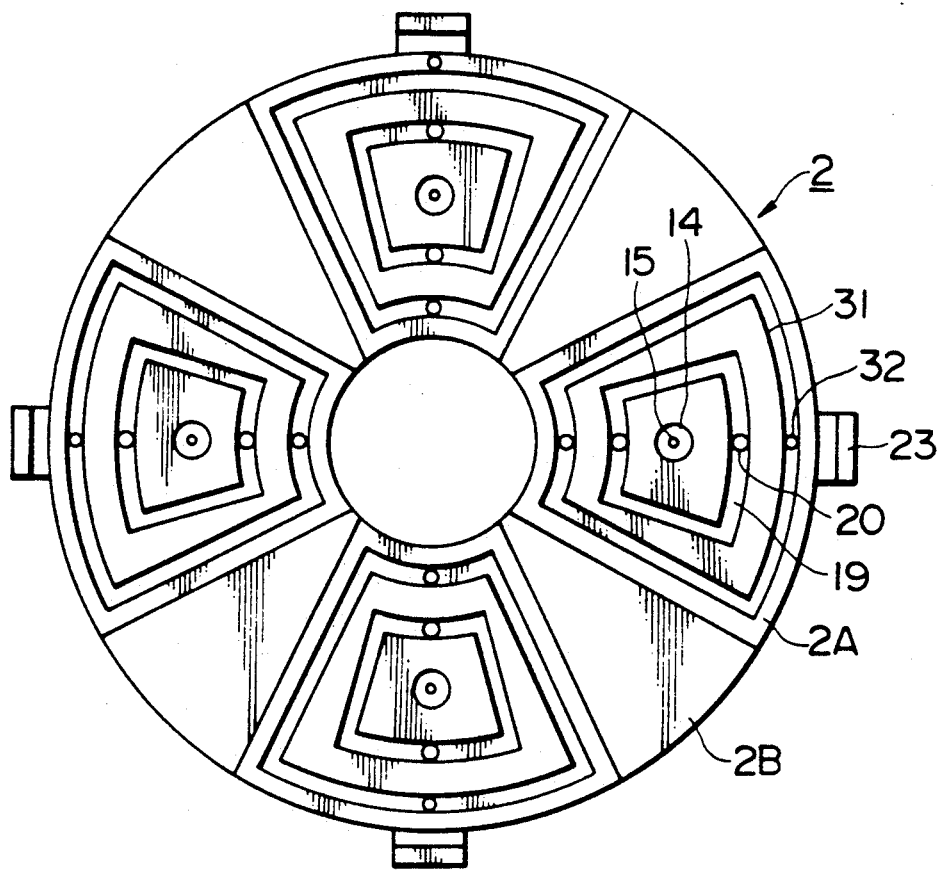

F I G. 19
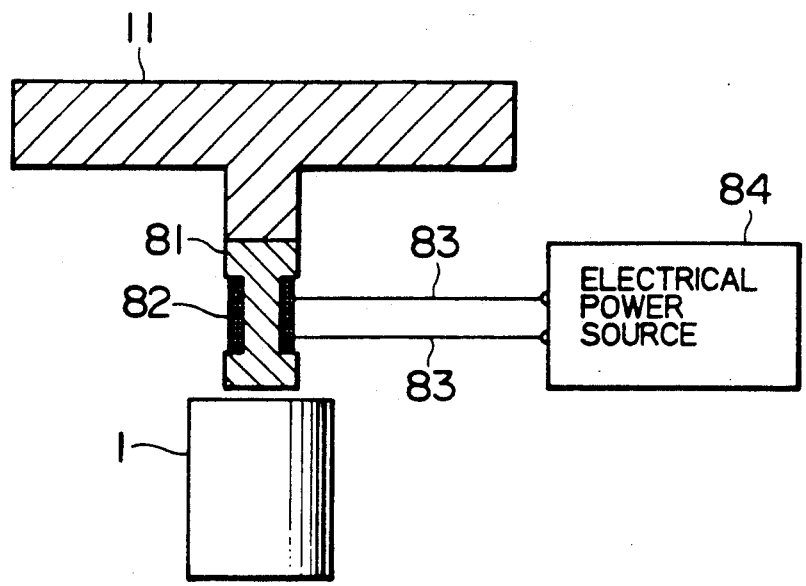
F I G. 20
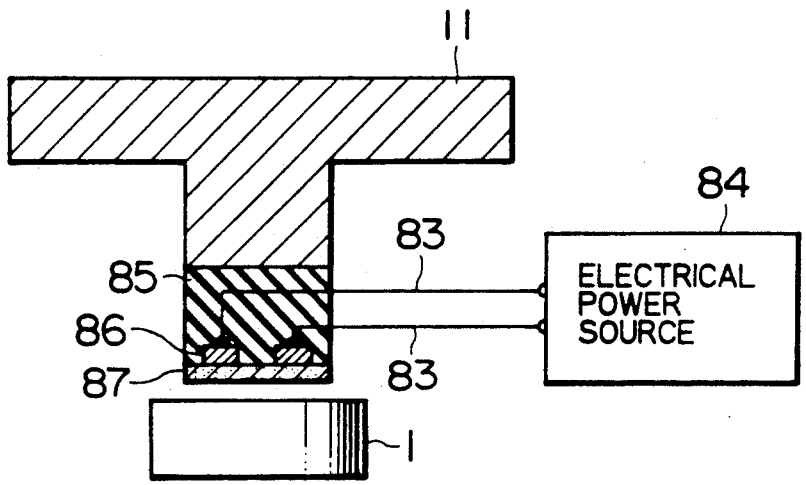
F I G. 21
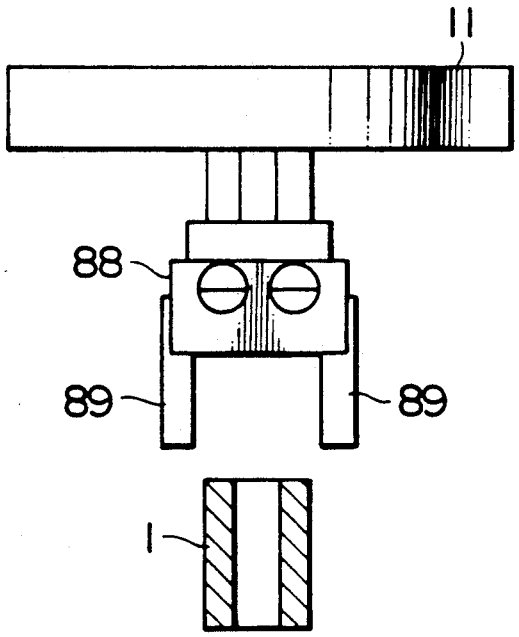

ARTICLE ASSEMBLING METHOD AND DEVICE

BACKGROUND OF THE INVENTION

The present invention relates to article assembling method and device capable of easily assembling articles without any contamination or damage of the articles even with a rather inferior accuracy of positioning of an article with respect to another article.

In general, an assembly process includes operations for fitting articles to objects. Fitting of precision parts in particular requires a high degree of positioning accuracy. In order to facilitate fitting of a precision part, Japanese Patent Unexamined Publication No. 51-55076 discloses a device in which a mechanism for holding an article is coupled to a positioning mechanism through an elastic member so that the article can easily be fitted to an object even when the positioning mechanism has a rather low positional resolution and accuracy.

A device is also known for fitting a disk on a spindle of a magnetic disk file assembly, in which, as shown in Nikkei Mechanical (No. 328, 1983), a disk mounting hand provided with a sensor and an inching mechanism holds and fits the disk on the spindle. The mounting hand has a suction pad capable of sticking to the disk and a 6-axis force sensor provided at a level above that of the suction pad so as to oppose the suction pad across the spindle hole formed in the disk.

Japanese Patent Unexamined Publication Nos. 62-211236 and 62-255335 disclose devices which are capable of holding plate-like members such as semiconductor wafer in a floating or non-contacting manner by combination of suction and jetting actions of a fluid.

The known device disclosed in Japanese Patent Unexamined Publication No. 51-55076 on the one hand offers an advantage that an article can be fitted easily without requiring high positioning accuracy but, on the other hand, poses a problem in that the article is undesirably forcibly pressed against or rubbed by a part to which the article is to be fitted by the force applied through the elastic member when the deviation of the article from the correct fitting position exists, resulting in generation of dust or scuffing and, hence, in contamination or damage of the article.

The art shown in Nikkei Mechanical (No. 328, 1983) employs a compliance mechanism which performs positioning of articles in the directions perpendicular to the fitting or insertion direction so as to avoid any rubbing or scuffing during fitting. More specifically, the compliance mechanism includes a sensor capable of sensing any reaction force generated as a result of contact between the article and the object and an inching mechanism capable of operating in response to the output from the sensor indicative of the occurrence of such contact so as to finely adjust the position of the article thereby preventing the article from being strongly pressed against the object. In this system, however, a contact inevitably takes place between the article, i.e., a disk, and the object, i.e., the spindle. In addition, a force greater than the resolution (several tens of grams) of the sensor is applied to the disk and a further greater force is applied to the disk due to delay of the action of the inching mechanism after the contact is sensed by the sensor. Consequently, damaging of the disk or the spindle and, thus, generation of dust is unavoidable. In general, assembly of precision parts strictly requires elimination of contamination and damage.

For instance, a disk assembling process in the production of a magnetic disk device requires that generation of dust is minimized. Usually, a reading/writing head is held in a floating position at a level 0.25 to 0.5 mm above a rotating disk. Any dust existing between the head and the disk causes a head crush which disables the head to read and write.

SUMMARY OF THE INVENTION

It is an object of the present invention to provide an article assembling device and method which are improved to assure that a first article is easily moved into engagement with a second article in such a manner that, even if the first article is not exactly accurately positioned relative to the second article, any pressure-contract does not takes place between the two articles to thereby prevent the articles from otherwise being spoiled or damaged by such contact.

The above object of the present invention can be achieved by an article assembling device according to the present invention which includes means for supporting an article in non-contacting and relatively movable relationship. The article supporting means is provided with a fluid bearing mechanism operative to form a fluid film between the article supporting means and the thus supported article. The article supporting means and the article supported thereby are moved into a position in which the article is aligned with another article. The thus aligned articles are then assembled together.

The article supporting means may alternatively be arranged such that an article is held by an article holding means which in turn is supported by the supporting means with a fluid film formed by the fluid bearing between the article holding means and the supporting means. In this alternative case, therefore, the article holding means is supported by the supporting means in non-contacting and relatively movable relationship, while the article is temporarily fixed to the article holding means until the article is aligned with another article. Thereafter, the first mentioned article may be released into engagement with another article.

The above and other objects, features and advantages of the present invention will be made more apparent by the following description with reference to the accompanying drawings.

BRIEF DESCRIPTION OF THE DRAWINGS

FIG. 7 is an axial sectional view of still another embodiment of the article assembling device of the invention;

FIG. 8 is a bottom plan view of the embodiment shown in FIG. 7;

FIGS. 19 or 20 are fragmentary sectional views modified article holding mechanism;

FIG. 21 is a front elevational view of a still modified article holding mechanism;

DESCRIPTION OF THE PREFERRED EMBODIMENTS

Figure 1:
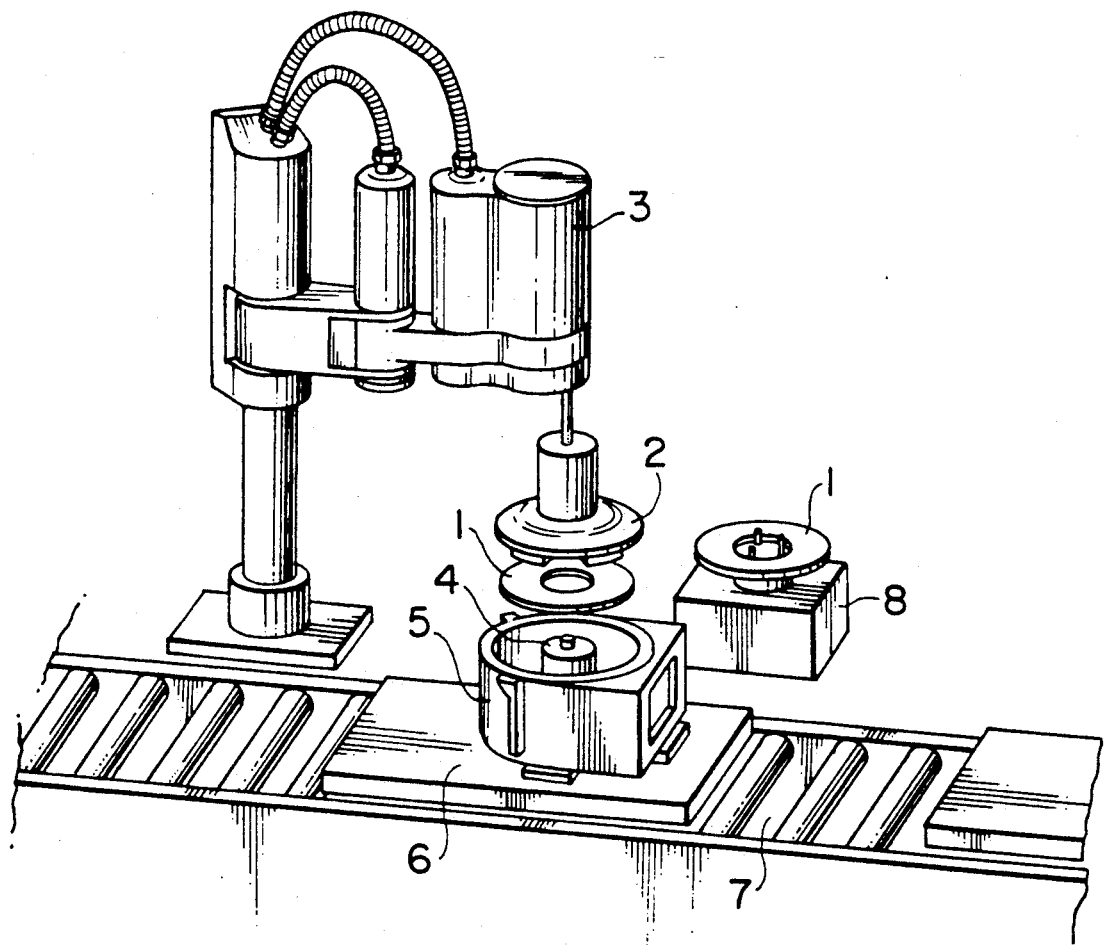
FIG. 1 is a perspective view of an embodiment of the article assembling device in accordance with the present invention.

Referring now to the drawings which like reference numerals are used throughout the various views to designated like parts and, more particularly, to FIGS. 1-4, according to these figures, an article assembling device of the present invention is provided for an article 1 such as, for example, a magnetic disk which is to be fitted onto an object 4 such as, for example, a spindle of a magnetic disk device 5.

Referring particularly to FIG. 1, the article 1, premounted on a table 8, is held by an article supporting mechanism 2 movable by a positioning mechanism 3 so that the article 1 is substantially axially aligned with the stationarily held object 4. The following description of the embodiment will proceed on an assumption that the assembling device is used in a system for mounting magnetic disks on a magnetic disk device 5. The magnetic disk device 5 is placed on a pallet 6 and is conveyed on a roller conveyor 7. Although the positioning mechanism 3 is shown in FIG. 1 to be connected to the article supporting mechanism 2, this is only illustrative and the positioning mechanism 3 may alternatively be connected to a support or pedestal for supporting the object 4.

An example of the article supporting mechanism 2 will be described with reference to FIGS. 2 and 3. The article supporting mechanism 2B has a disk-shaped main part generally designated by the reference numeral 2 having a plurality of article supporting surfaces 2A which support the disk 1 in a non-contacting manner, i.e., leaving a clearance 13 between itself and the disk 1. Each supporting surface 2A is provided with a fluid bearing which is composed of a fluid suctioning system for suctioning a fluid from the clearance 13 so as to maintain a sub-atmospheric pressure in the clearance 13 and a fluid supplying system for jetting a pressurized fluid into the clearance.

The fluid suctioning system has a plurality of annular grooves 19 surrounding the supporting surfaces 2A and communicating with a suction source 22 through fluid suction passages 20 in the main part 2B and through a conduit 21.

The fluid jetting system has a plurality of openings 14 disposed at the centers of the respective supporting surfaces 2A and having orifices 15 which communicate with a source 18 of a pressurized fluid through fluid supply passages 16 in the main part 2B and through a conduit 17. Stop members 23 are provided along the outer periphery of the main part 2B and capable of limiting the movement of the thus held article 1 along the supporting surfaces 2A.

Figure 4:
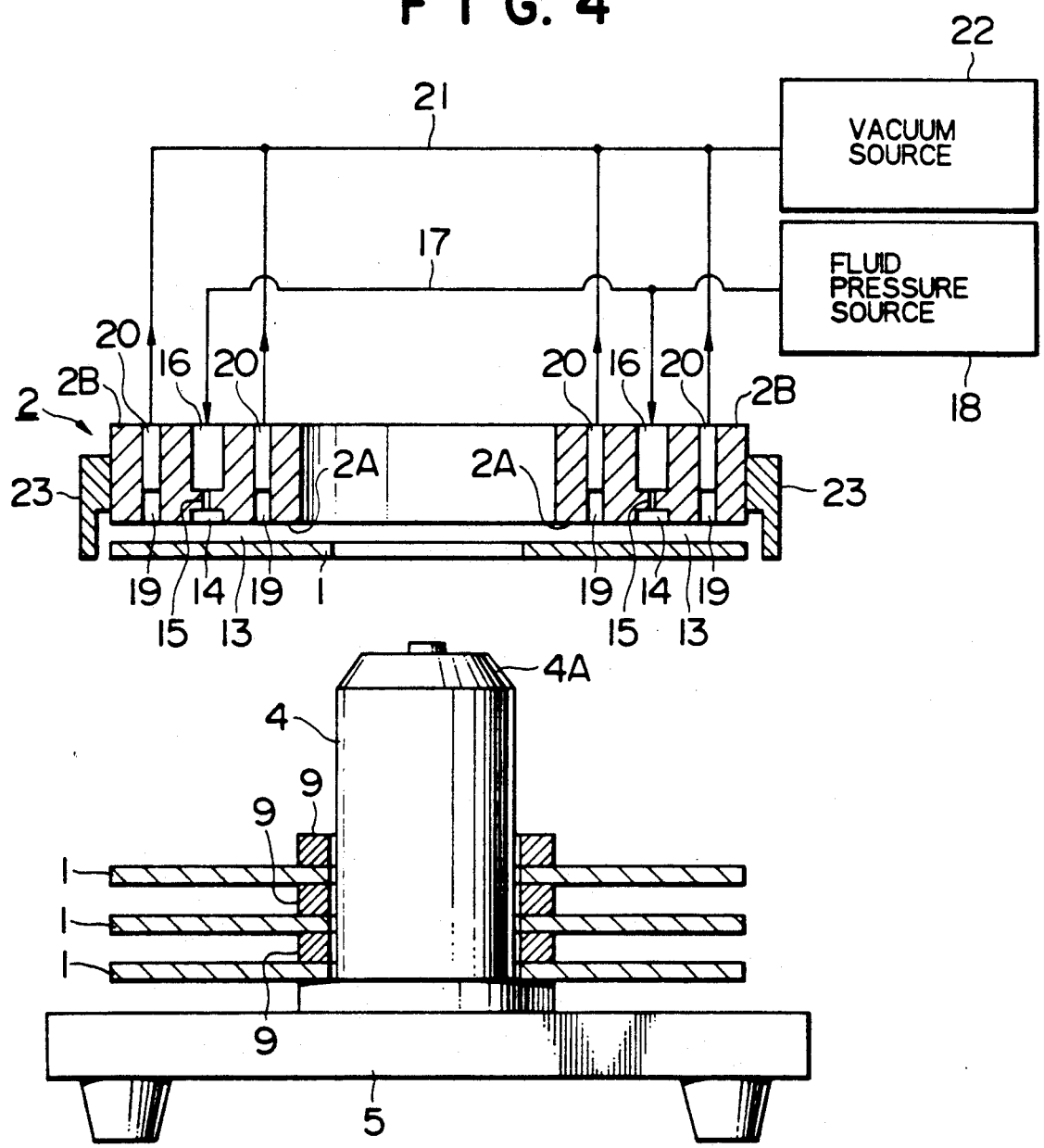
FIG. 4 is a fragmentary sectional view of the embodiment shown in FIG. 1 illustrative of the operation for fitting an article.

Referring now to FIG. 4, the object 4 to which the article 1 is to be fitted is provided at its end with a tapered surface 4A. The area of the tapered surface 4A, as projected in the direction of the fitting movement of the article is greater than the amount over which the article 1 is movable in the direction parallel to the supporting surfaces 2A.

Before a description is made of the whole fitting device, a description will be made of the principle of the non-contacting support of the disk 1 by the supporting surfaces 2A of the supporting mechanism 2.

Figure 2:
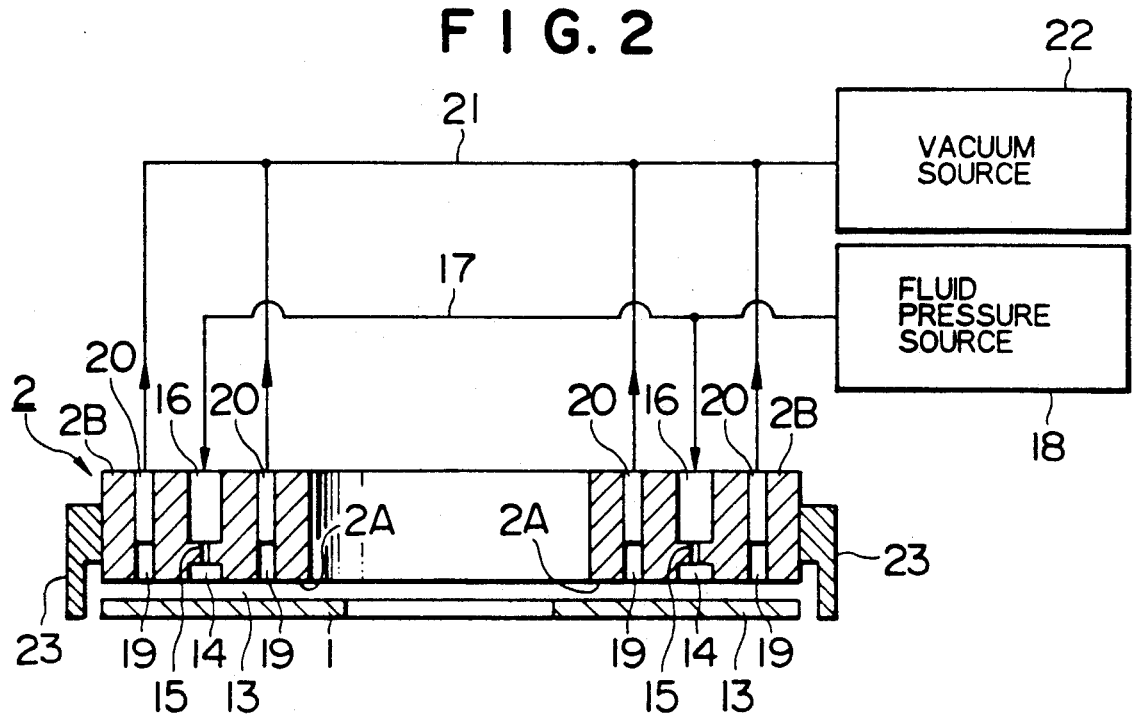
FIG. 2 is a diagrammatic sectional view of a part of the embodiment shown in FIG. 1.
Figure 3:
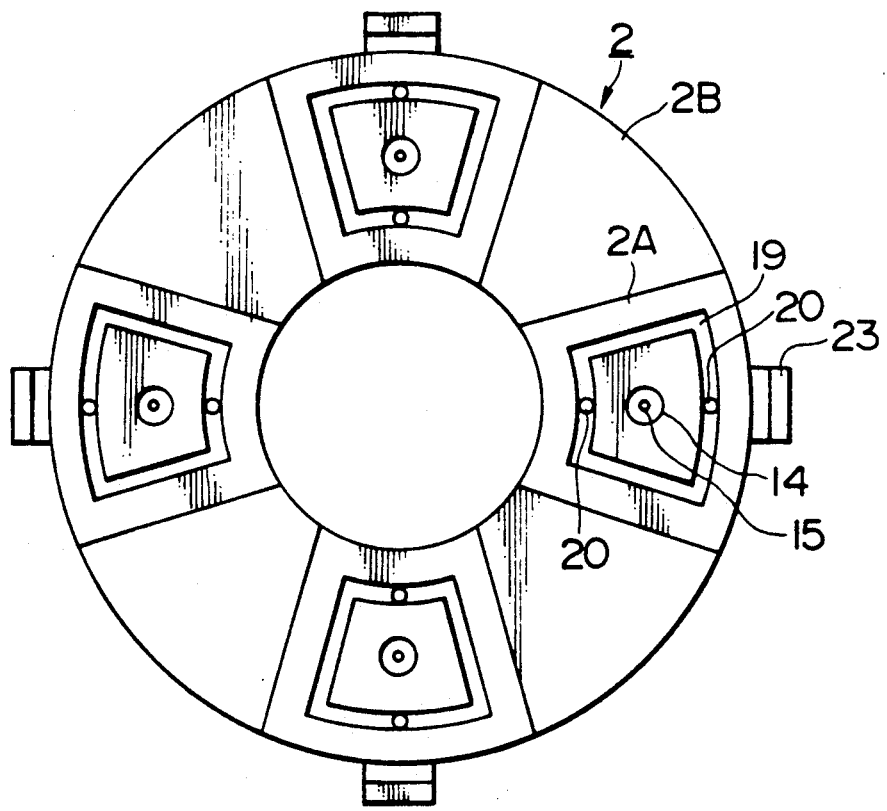
FIG. 3 is a bottom plan view of the embodiment shown in FIG. 1.

Referring to FIGS. 2 to 4, an operation of the fluid suction source 22 causes a fluid to be suctioned from the annular grooves 19 through the conduit 21 and the fluid suction passages 20 so that the pressure in the annular grooves is reduced to a level below the atmospheric pressure. Consequently, a vacuum force is generated to suspend the weight of the disk 1. Meanwhile, the pressurized fluid source 18 kept at a pressure higher than that in the annular grooves 19 supplies a pressurized fluid into the clearance 13 through the conduit 17, the fluid supply passages 16, the orifices 15 and the openings 14 to create a pressure higher than the atmospheric pressure in the clearance 13. It will be seen that the pressure in the clearance 13 varies according to the size of the clearance 13, so that the pressure decreases and increases as the size of the clearance becomes small and large, respectively. Consequently, a balance is obtained between the force produced by the positive pressure supplied from the pressurized fluid source 18 and the force produced by the vacuum created by the fluid suction source 22 so that the disk 1 is held by the supporting mechanism 2 in a non-contact manner leaving a small gap between itself and the supporting surfaces 2A.

After the disk 1 has been thus supported, the supporting mechanism 2 is moved by a positioning mechanism through an arm so as to locate or position the disk 1 substantially in axial alignment with the spindle 4.

Referring to FIG. 4, the spindle 4 carries a plurality of disks 1 through the intermediary of spacers 9. Each disk 1 can be moved freely along the supporting surfaces 2A within a region limited by the stop members 23, because the disc is held in a non-contacting manner by the supporting surfaces 2A of the supporting mechanism 2 leaving a constant gap therebetween. Since the tapered surface 4A is provided on the upper end of the spindle 4, a movement of the disk 1 in the fitting direction, i.e., towards the spindle 4, causes the edge of a central hole in the disk 1 to engage the tapered surface 4A and a further movement of the disk 1 in the fitting direction causes the disk 1 to be automatically centered with respect to the spindle 4 by virtue of the guiding effect provided by the tapered surface 4. It is thus possible to fit the disk 1 onto the spindle 4 despite any slight mis-alignment of the fitting hole in the disk 1 with respect to the spindle 4. It will be understood that, since the disk 1 is allowed to move freely along the supporting surfaces 2A without encountering any resistance, no substantial contact pressure acts between the disk 1 and the spindle 4 during the fitting. Then, the disk 1 is lowered to a predetermined level and both the fluid suctioning and fluid supplying operations are terminated so that the disk 1 is freed and left on the spindle 1 as a result of a subsequent lifting of the supporting device 2 by the arm of the positioning mechanism 3.

If necessary, the supporting mechanism 2 can have a plurality of holes which blow air to the fitting portion, e.g., the edge of the central hole, of the disk 1 so that the disk can be fitted onto the spindle 4 in a completely non-contact manner.

The positioning mechanism is capable of positioning the article, e.g., the disk, with respect to the object, e.g., the spindle, with a predetermined degree of positional accuracy.

As will be understood from the foregoing description, the article holding mechanism or the fluid bearing on this mechanism allows a change of the position of the article with respect to the positioning mechanism, i.e., a movement of the article along the bearing surface relative to the positioning mechanism, in such a manner that the dimension of the clearance of the fluid bearing is held constant. It is, therefore, possible to easily fit the disk 1 on the spindle 4 without causing the disk 1 to be pressed onto the spindle 4, thus eliminating problems such as contamination or damage of the disk 1, even when the accuracy of positioning of the disk 1 with respect to the spindle 4 is not so high. Needless to say, the use of the fluid bearing which holds the disk 1 through a fluid film eliminates any contamination or damage of the disk which otherwise would be caused by a mechanical contact between the supporting mechanism and the disk.

Figure 5:
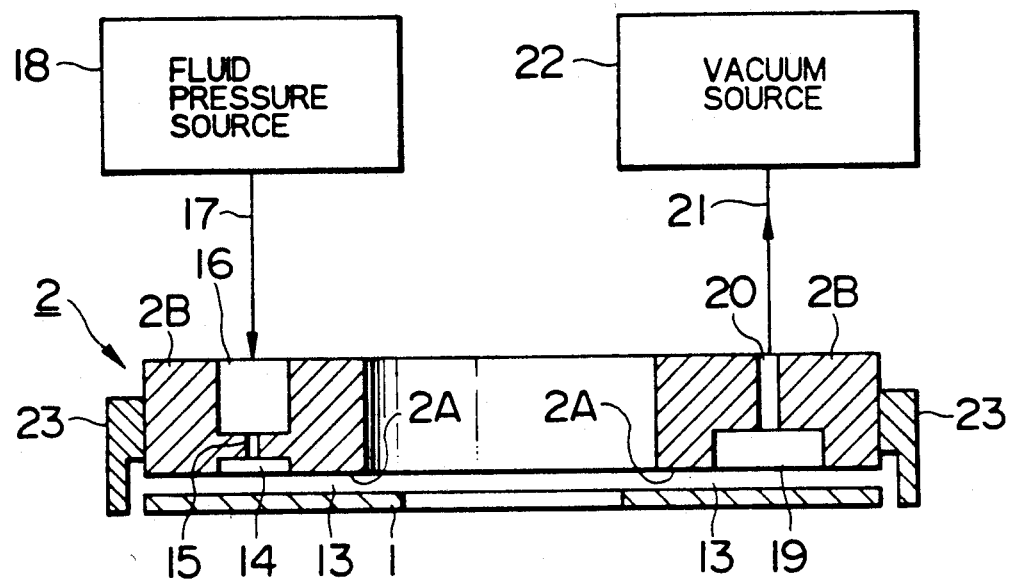
FIG. 5 is an axial sectional view of another embodiment of the article assembling device of the present invention.
Figure 6:
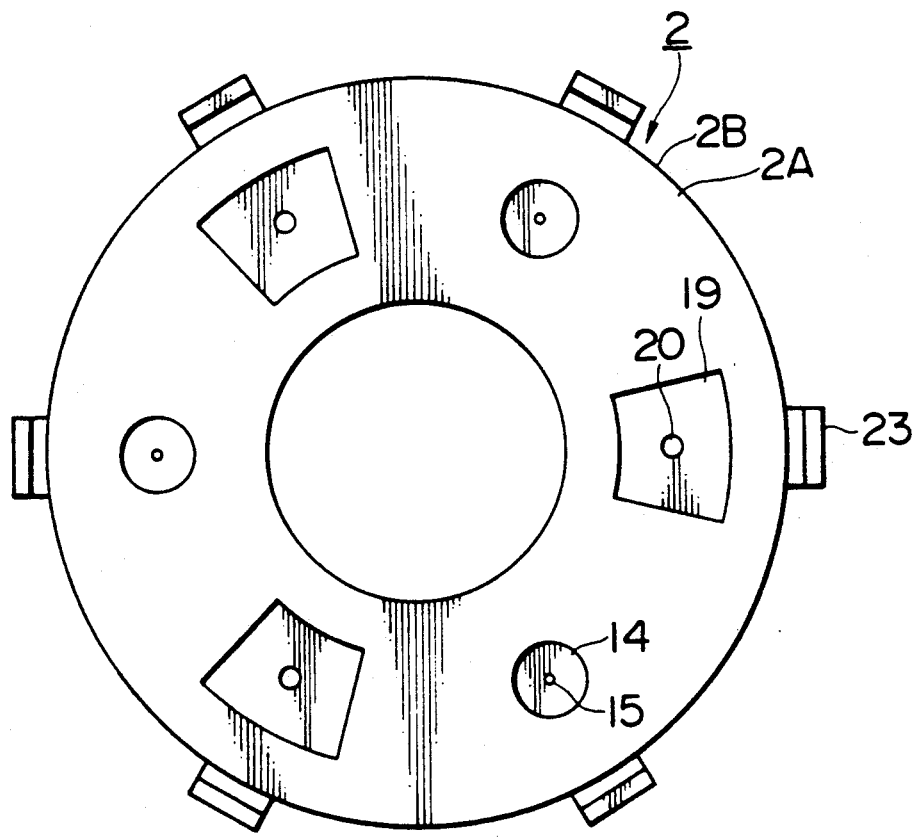
FIG. 6 is a bottom plan view of the embodiment shown in FIG. 5.

In the embodiment of FIGS. 5 and 6, the supporting mechanism 2 has a disc supporting surface 2A in which openings of the fluid suction system and the fluid jetting system are arranged in a side-by-side manner substantially on a common circle. More specifically, the fluid suction system includes openings 19 which are communicated with the fluid suction source 22 through suction passages 20 formed in the main part 2B of the supporting mechanism 2 and through a conduit 21. On the other hand, the fluid jetting system has openings 14 formed in the supporting surface 2A and communicating with a pressurized fluid source 18 through orifices 15, fluid supply passages 16 in the main part 2B and through a conduit 17. According to this embodiment, since the openings of the fluid suction and discharge systems are arranged in a side-by-side relation, it is possible to provide a large area for the supporting surface 2A around the openings of the fluid suction and discharge systems even when the article 1 is small or has a small area opposing to the supporting surface 2A. It is, therefore, possible to stably hold in non-contact manner a small-sized article 1 or an article 1 which has a small width of the region to be supported.

In the embodiment of FIGS. 7 and 8, openings of fluid suctioning and jetting systems are formed in each of a plurality of supporting surfaces 2A of the supporting mechanism and, in addition, an annular seal groove 31 is formed in a peripheral portion of each supporting surface 2A so as to surround the openings of the fluid suction and jetting systems for the purpose of preventing the flow of external air into the bearing clearance 13. The annular groove 31 is communicated with a clean fluid source 34 through a fluid passage 32 in the main part 2B of the supporting mechanism 3. The clean fluid source 34 may be the clean ambient air or a pressurized fluid source which supplies clean fluid to the seal groove 31 through a conduit 33.

Figure 9:
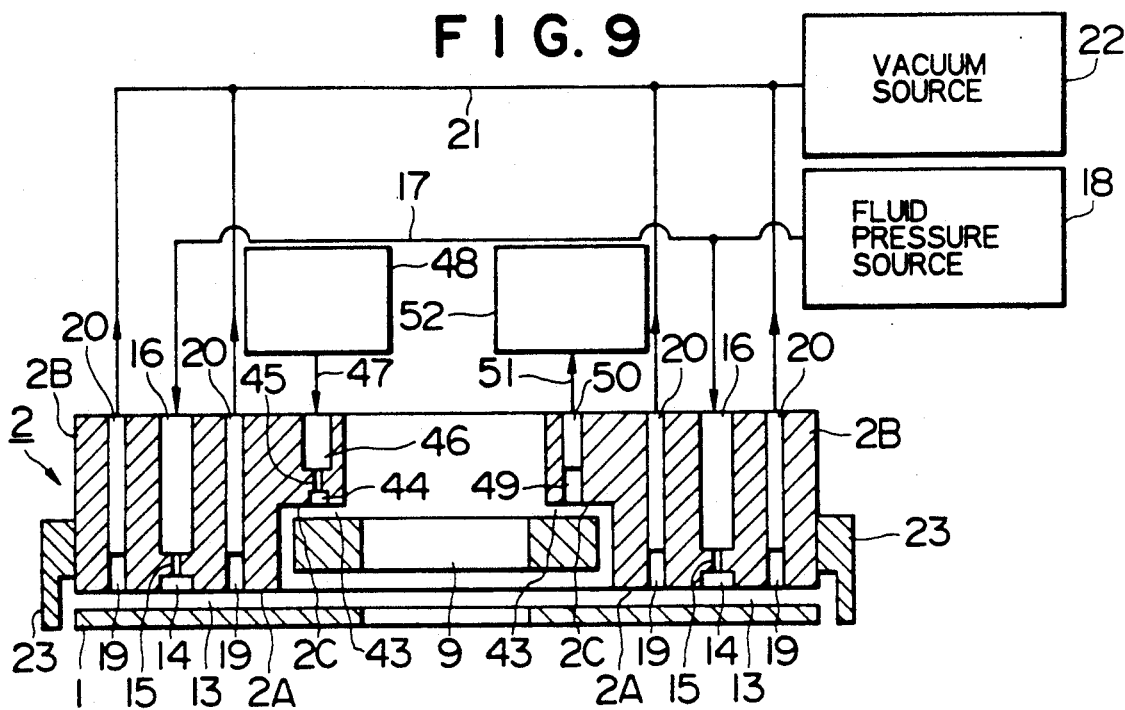
FIG. 9 is an axial sectional view of a further embodiment of the article assembling device of the present invention.
Figure 10:
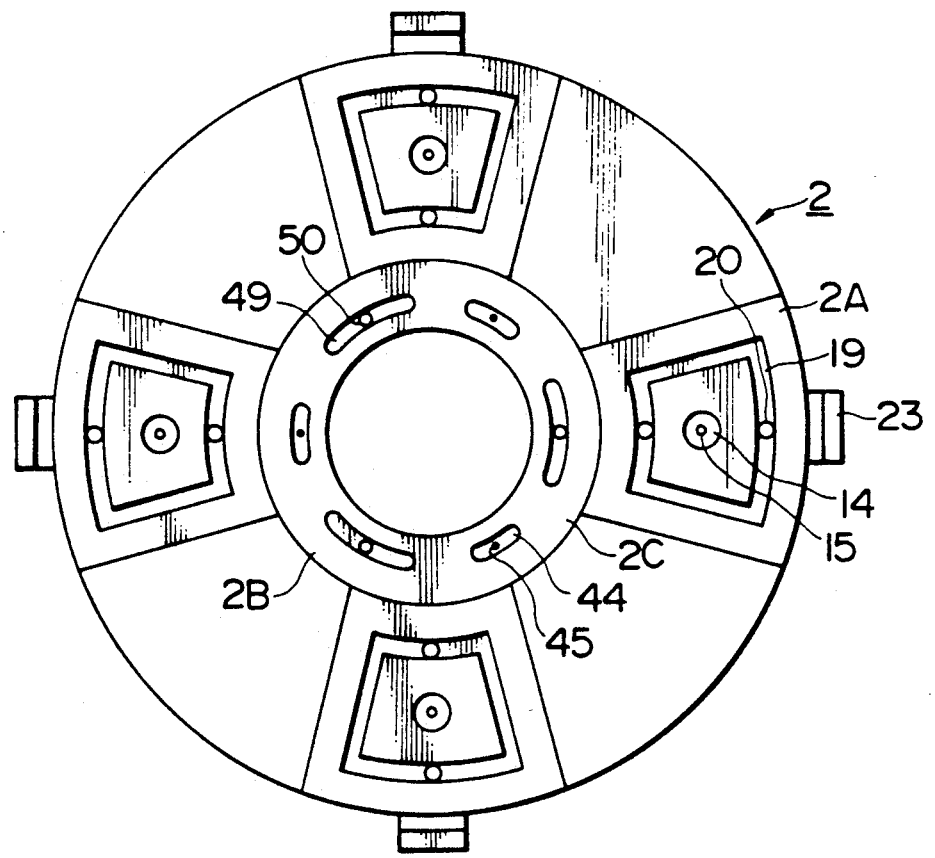
FIG. 10 is a bottom plan view of the embodiment shown in FIG. 9.

In this embodiment of FIGS. 7 and 8, the air around the supporting mechanism 2, which may suspend dust, is prevented from flowing into the bearing clearance 13, thus eliminating the risk for the article 1 to be contaminated by the dust suspended by the ambient air. In the embodiment of FIGS. 9 and 10, the supporting mechanism 2 has a first fluid bearing for supporting the article 1 to be fitted to the object 4 and in addition, a second fluid bearing for supporting a second article 9 which is to be fitted to the object 4 simultaneously with the article 1. The second fluid bearing includes a supporting surface 2C which defines in cooperation with the surface of the second article 9 a uniform clearance therebetween, a plurality of fluid jetting systems 44 each having an orifice 45, opening in the supporting surface 2C to apply a fluid pressure higher than the atmospheric pressure to the second article 9 opposing the supporting surface 2C, and a plurality of fluid suction systems 49 each opening in the supporting surface 2C to apply a sub-atmospheric pressure to the second object 9.

This embodiment is suitably used in, for example, mounting a magnetic disk 1 as the article together with the spacer 9 as the second article by a single fitting operation. This embodiment, therefore, offers a high efficiency of operation for mounting magnetic disks 1 together with spacers 9 on the spindle 4 of the magnetic disk device 5 in a manner shown in FIG. 4.

Figure 11:
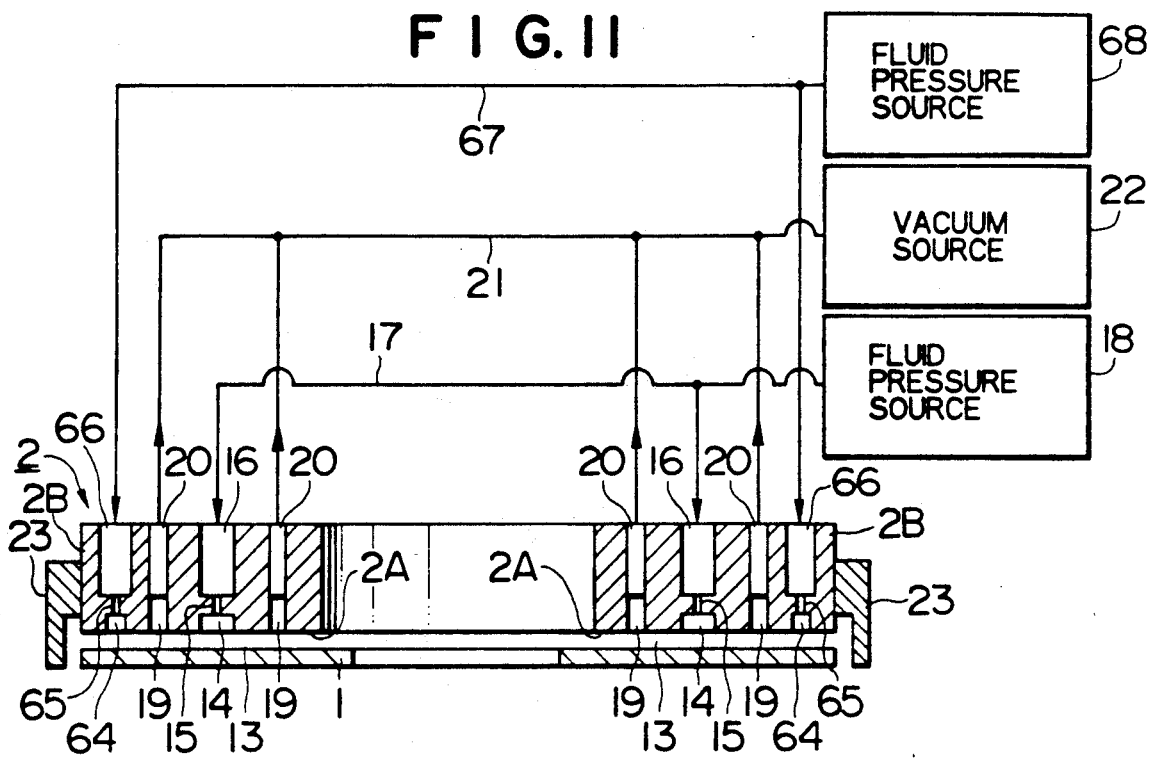
FIG. 11 is an axial sectional view of a still further embodiment of the present invention.
Figure 12:
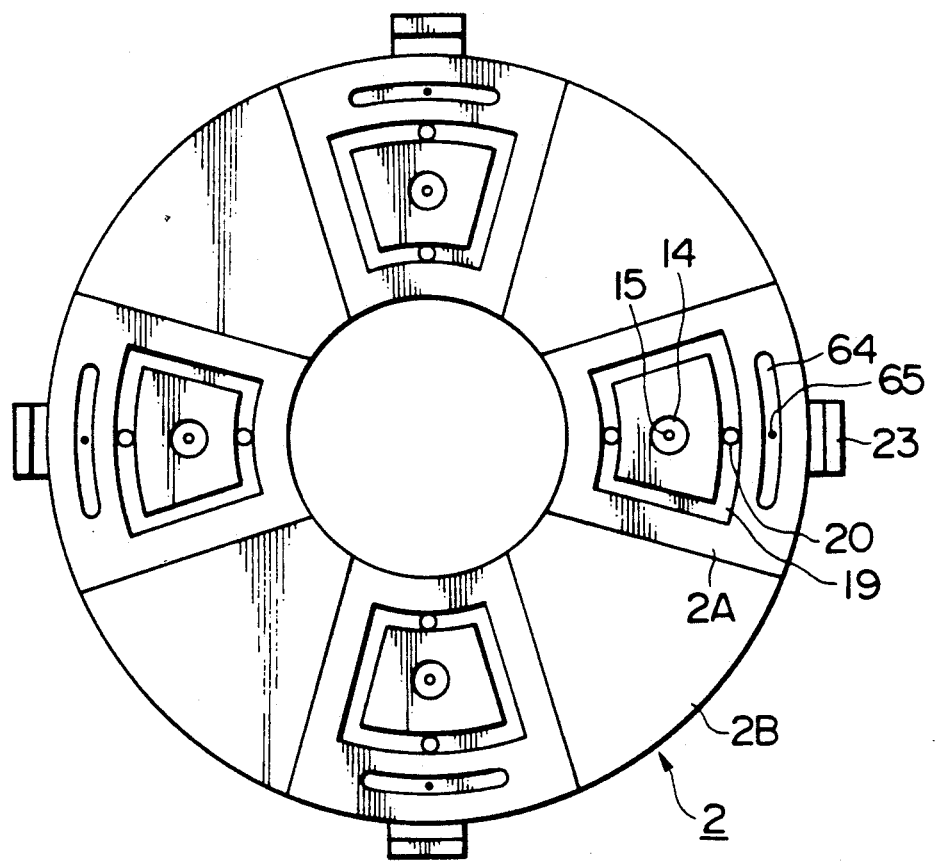
FIG. 12 is a bottom plan view of the embodiment shown in FIG. 11.

The embodiment of FIGS. 11 and 12 also employs a supporting mechanism 2 having a fluid bearing for supporting an article to be fitted. In addition, a contact-prevention fluid jetting system is provided in the radially outer end portion of each supporting surface 2A so as to produce a pressure which is higher than the atmospheric pressure and which acts on the portion of the article 1 opposing each holding surface 2A. The contact-prevention fluid getting system in each contact surface 2A includes a groove 64 formed in the radially outer end of the supporting surface and an orifice 65 connected to the groove 64 and communicating with a pressurized fluid source 68 through a fluid supply passage 66 and a conduit 67.

In this embodiment, the contact-prevention fluid jetting systems at the outer peripheral portion of the supporting mechanism 2 effectively prevent the occurrence of any contact between the article 1 and the supporting surface 2A due to inclination of the article 1 during setting of the article 1 on the supporting mechanism or during fitting of the article to the object 4, thus preventing contamination and damage of the article 1 which would otherwise be caused by a contact between the article 1 and the holding surface 2A.

Figure 13:
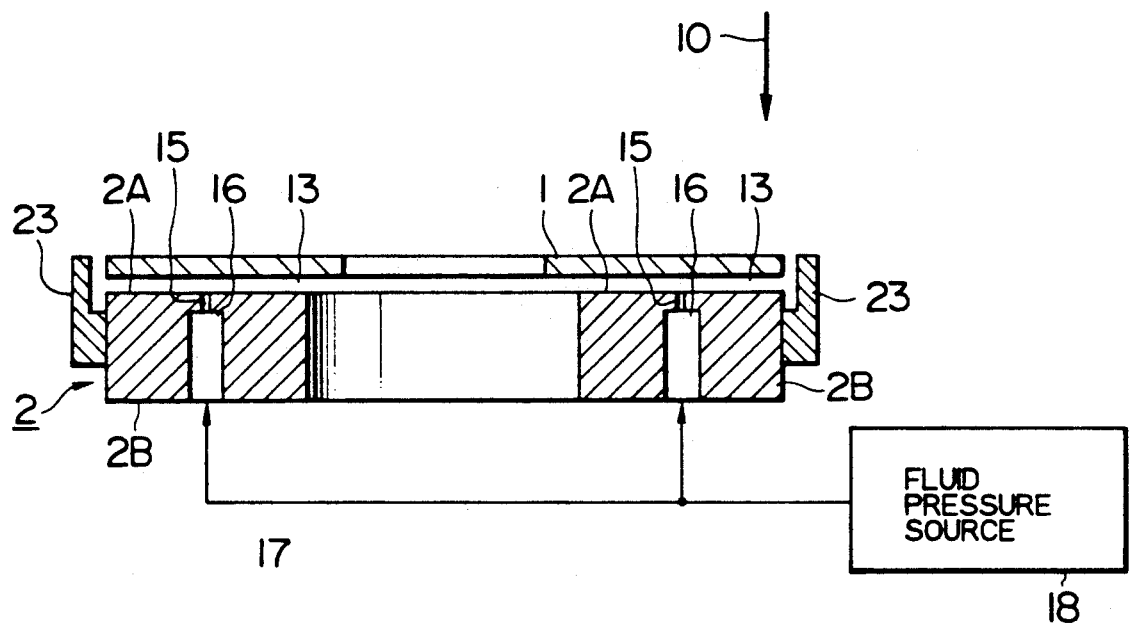
FIG. 13 is an axial sectional view of a still further embodiment of the article assembling device of the present invention.
Figure 14:
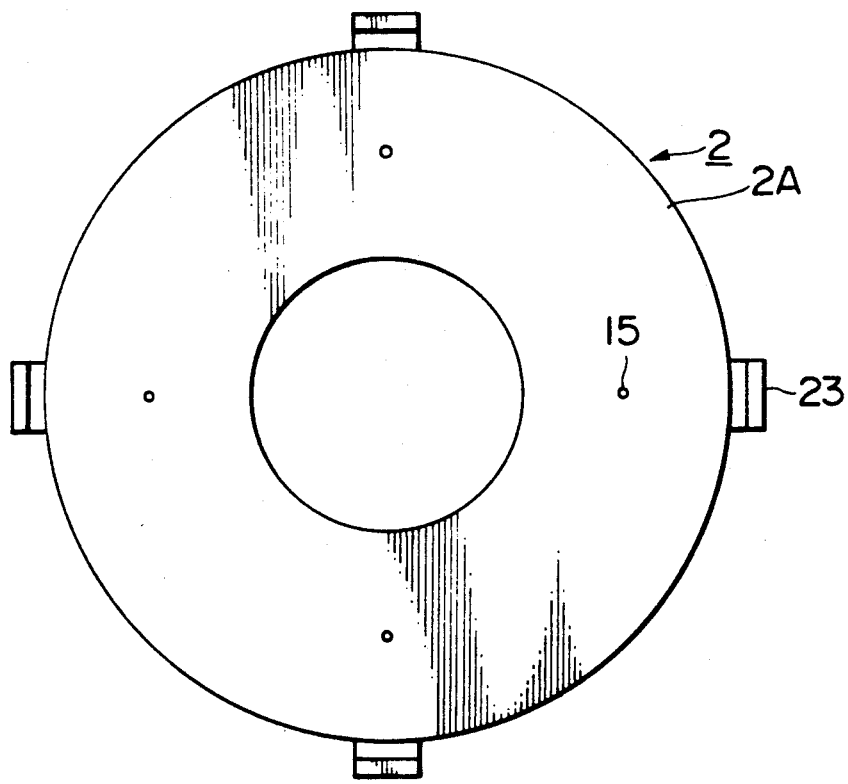
FIG. 14 is a bottom plan view of the embodiment shown in FIG. 13.
Figure 15:
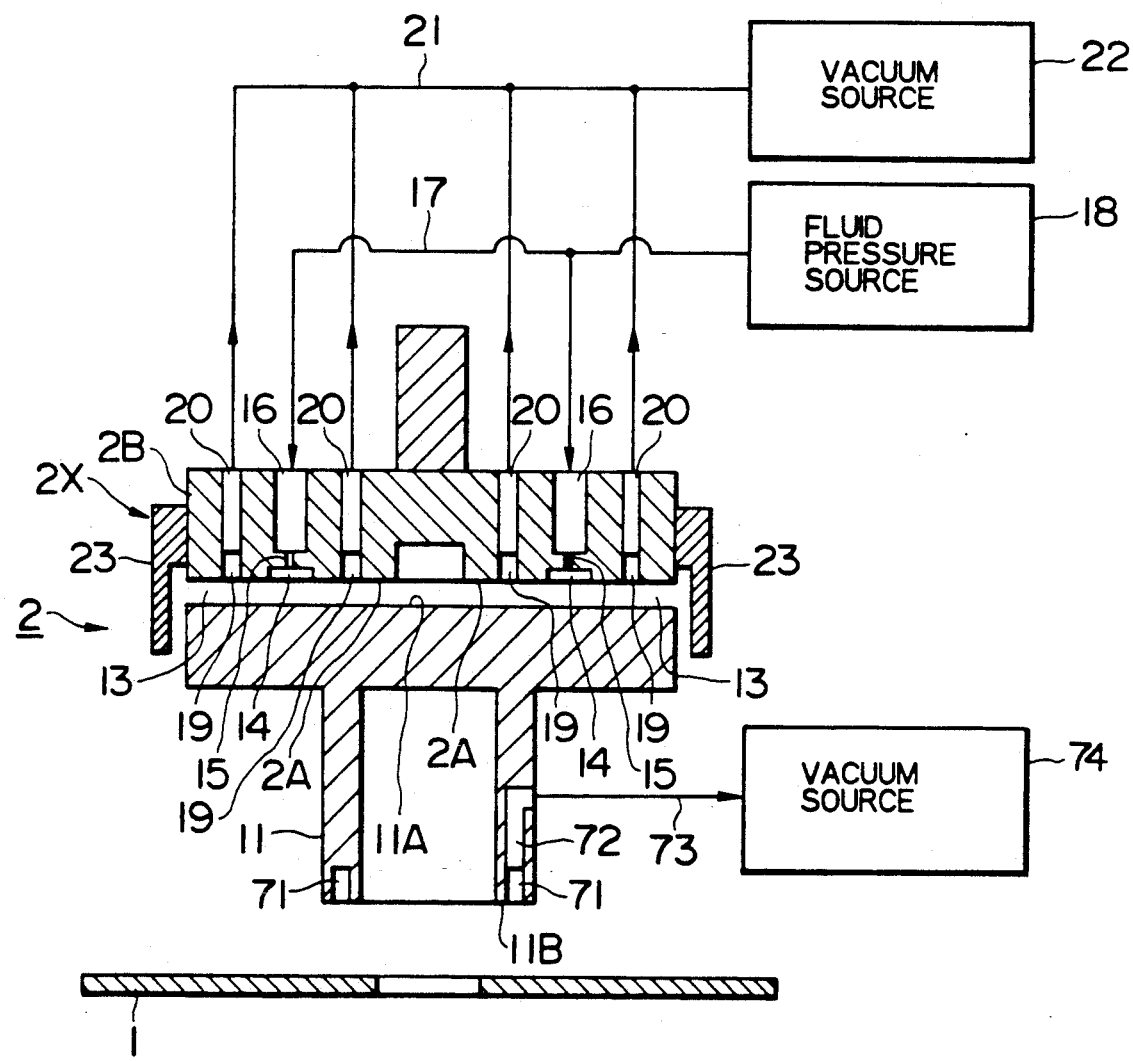
FIG. 15 is an axial sectional view of a still further embodiment of the article assembling device of the present invention, showing in particular first and second holding units of a supporting mechanism.
Figure 16:
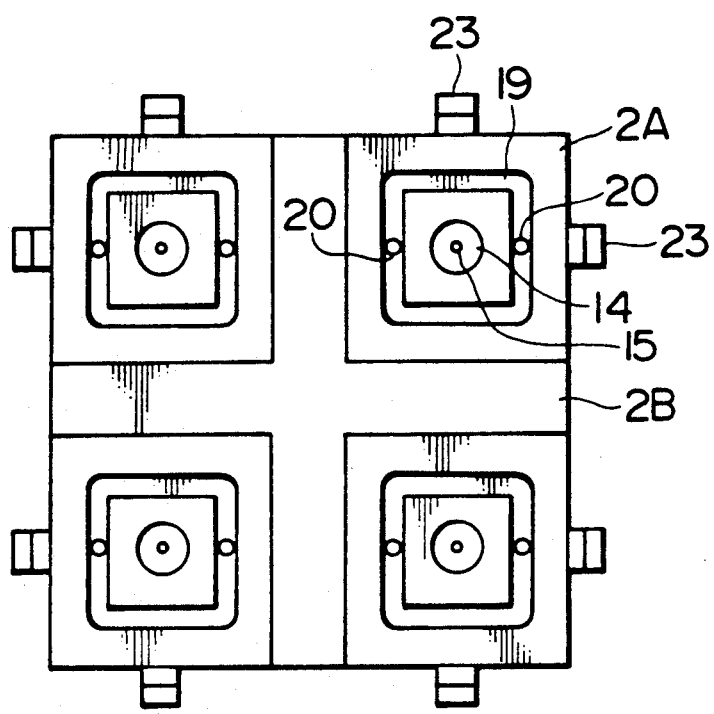
FIG. 16 is a bottom plan view of the second unit shown in FIG. 15.
Figure 17:
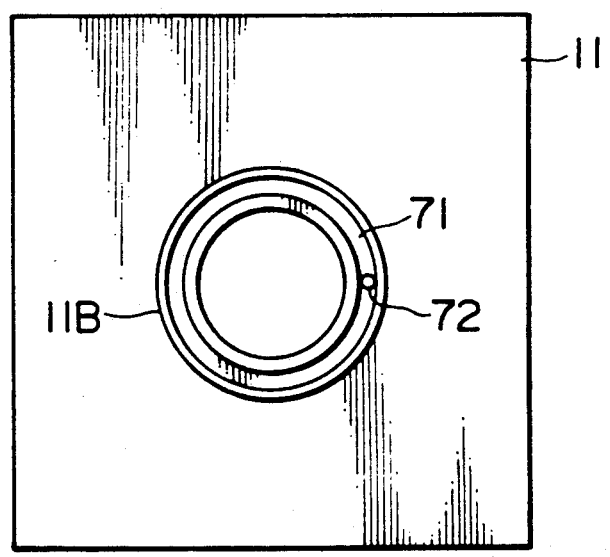
FIG. 17 is a bottom plan view of the second unit shown in FIG. 15.

In the embodiment of FIGS. 13 and 14, the supporting mechanism 2 is designed such that its upper side provides the supporting surface 2A so as to hold or support an article 1 in a non-contact manner. To this end, a plurality of fluid jetting systems are provided to open in the supporting surface 2A so as to discharge a fluid under pressure thereby to produce a pressure higher than the atmospheric pressure so as to enable the article 1 to be held above the supporting surface 2A. The fluid jetting systems include orifices 15 which open in the supporting surface 2A. The orifices 15 are communicated with a pressurized fluid source 18 through fluid supply passages 16 in the main part of the supporting mechanism 2 and through a conduit 17. In FIG. 13, an arrow 10 indicates the direction of force of gravity.

In this embodiment, the force of gravity on the article 1 acts in the direction which reduces the clearance 13 between the supporting surface 2A and the object 1, so that the article 1 can be supported in a non-contacting manner even when it has a large weight. In addition, the construction of the fluid bearing is simplified because only the positive pressure system for discharging pressurized fluid is formed in the supporting surface 2A.

In the embodiment of FIGS. 15-18, the supporting mechanism 2 has a first unit 2X and a second unit 11 supported by the first unit. The first unit 2X has supporting surfaces 2A each having a fluid suction system and a fluid jetting system which in cooperation form a fluid bearing. The second unit 11 is supported by the supporting surfaces 2A of the first unit 2X in a non-contact manner leaving a clearance 13 therebetween. The second unit 11 has a surface 11A opposing the supporting surfaces of the first unit 2X and is provided with a vacuum system for suctioning and holding an article 1. The vacuum system includes a suction surface 11B for suctioning the article 1 and an annular vacuum groove 71 formed in the suction surface 11B. The vacuum groove 71 is communicated with a vacuum source 74 through a suction passage 72 formed in the second unit 11 and through a conduit 73.

Figure 18:
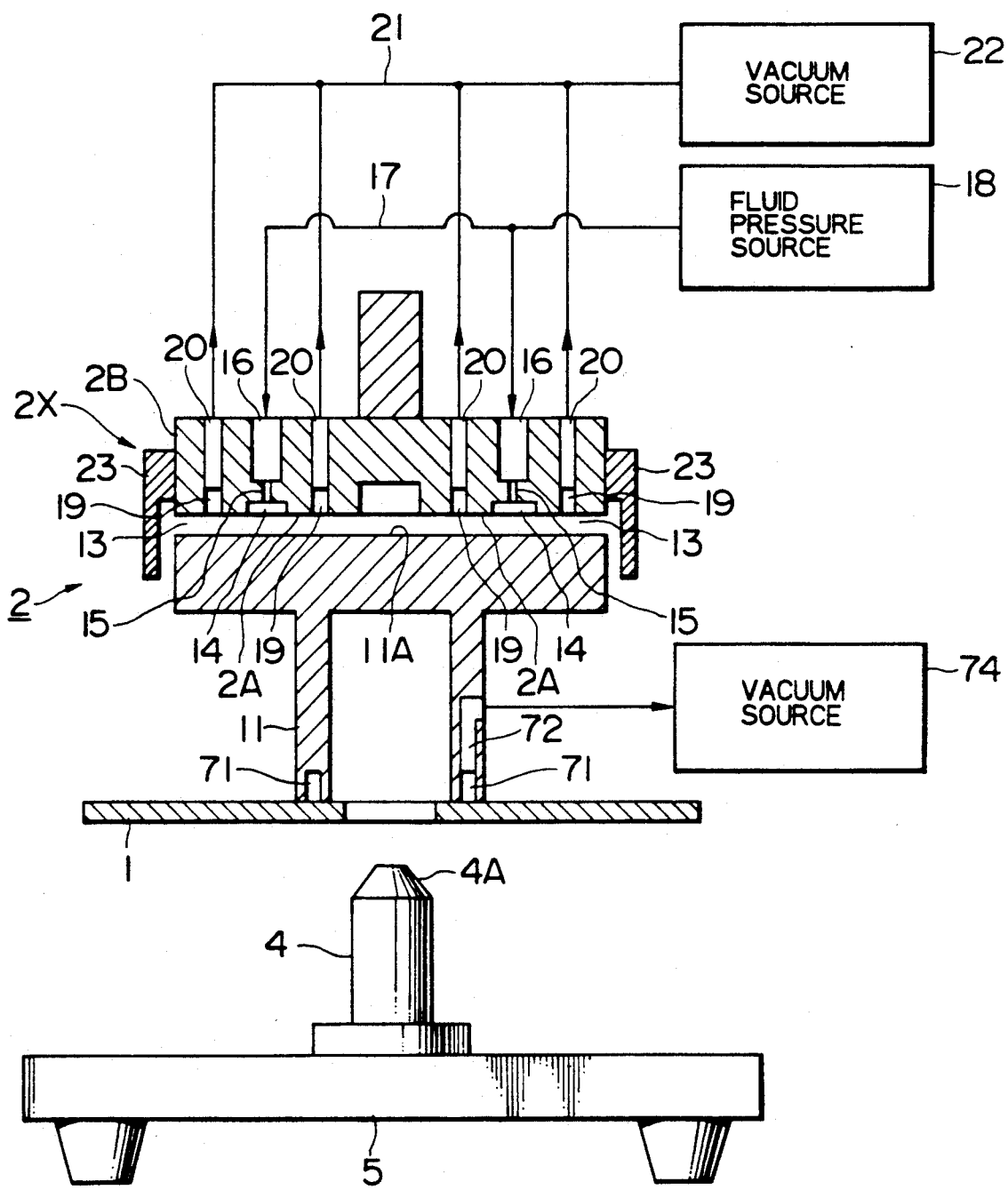
FIG. 18 is an axial sectional view of the embodiment shown in FIG. 15 illustrative of an article assembling or fitting operation.

In this embodiment, the article is held by the second unit 11 which in turn is supported by the supporting surfaces 2A of the first unit 2X in a non-contact manner with a constant clearance 13 left therebetween. Therefore, the article 1 held by the second unit 11 is allowed to freely move in the directions parallel to the supporting surfaces 2A without encountering substantial resistance. The manner in which the article 1 is positioned with respect to the object 4 is substantially the same as those in the preceding embodiments. As the article 1 is moved closer to the object 4, as shown in FIG. 18, a portion of the article 1 is brought into engagement with the tapered portion 4A of the object 4. Then, the article 1 is automatically centered or aligned by the guiding function of the tapered surface 4A so that the article 1 can be correctly fitted without any friction or pressure contact.

Because the suction system of the second unit opens in the suction surface of a very small area and is capable of producing a large holding force, and because the second holding unit holding the article 1 is held in non-contacting manner by the first holding unit 2X, it is possible to determine the areas and the shapes of the supporting surfaces 2A of the first unit 2X regardless of the configuration of the article 1 to be held. With this embodiment, therefore, it is possible to correctly fit the article 1 on the object 4 even when the article has a small size and a large weight.

In this embodiment, the second unit 11 employs a vacuum type suction system for holding the article 1. The vacuum suction type holding system, however, may be substituted by other suitable holding system such as, for example, a solenoid system shown in FIG. 19 which includes a core 81, a coil 82, conductors 83 and an electrical power supply 84; an electrostatic system shown in FIG. 20 which includes an insulator 85, electrodes 86, a dielectric film 87, conductors 83 and an electrical power supply 84; or a robot hand 88 shown in FIG. 21 which includes gripping claws 89.

Figure 22:
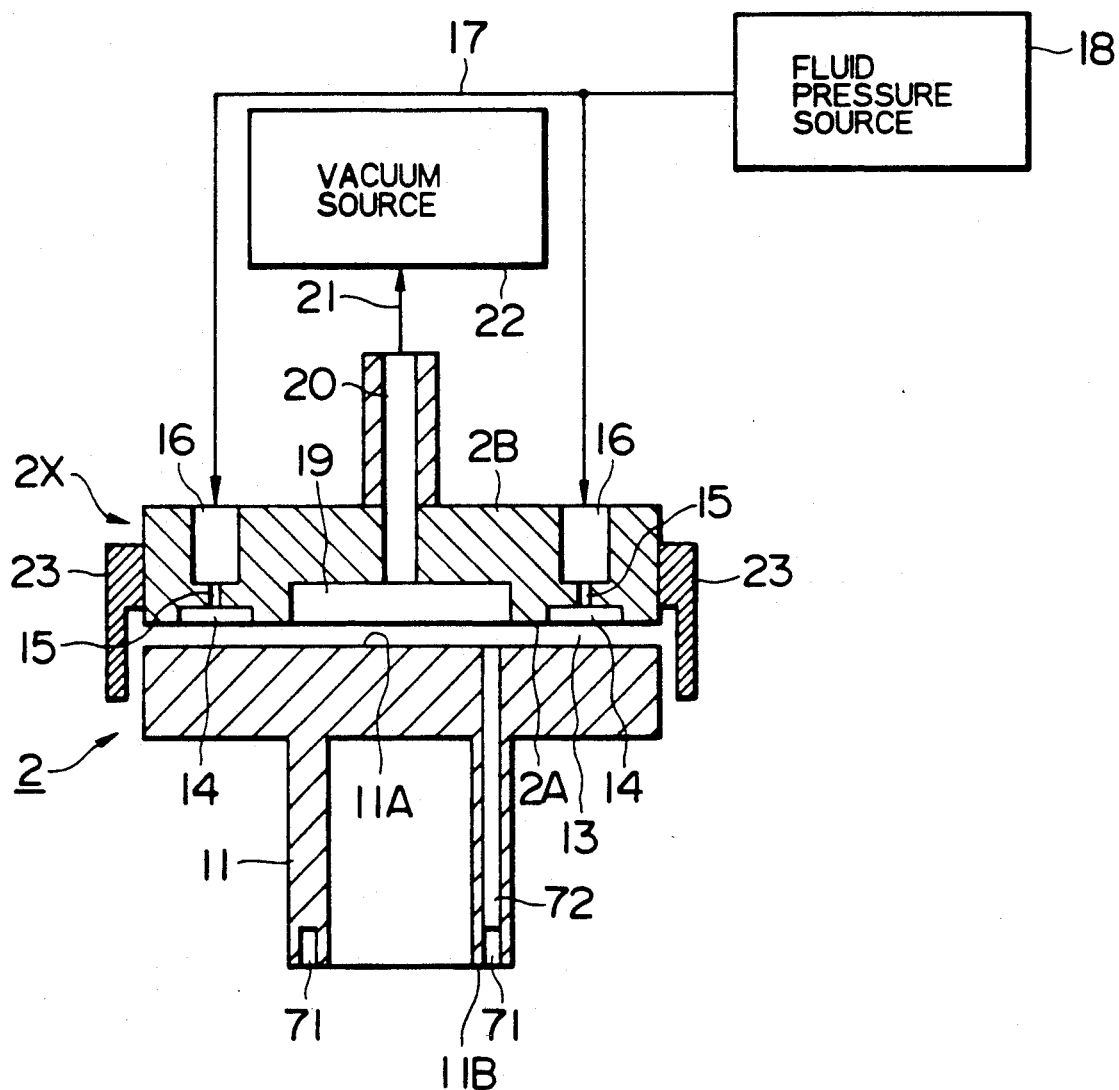
FIG. 22 is an axial sectional view of a still further embodiment of the present invention in which a supporting mechanism has first and second holding units.
Figure 23:
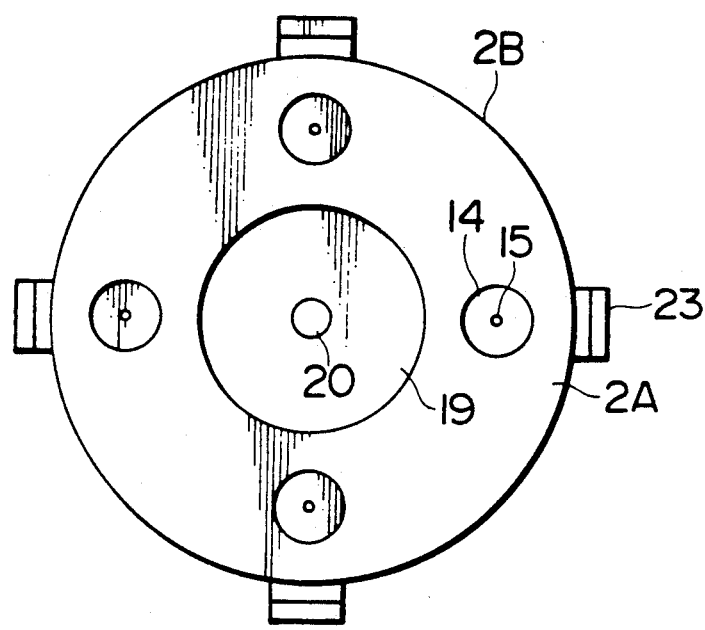
FIG. 23 is a bottom plan view of a first holding unit of the embodiment shown in FIG. 22.
Figure 24:
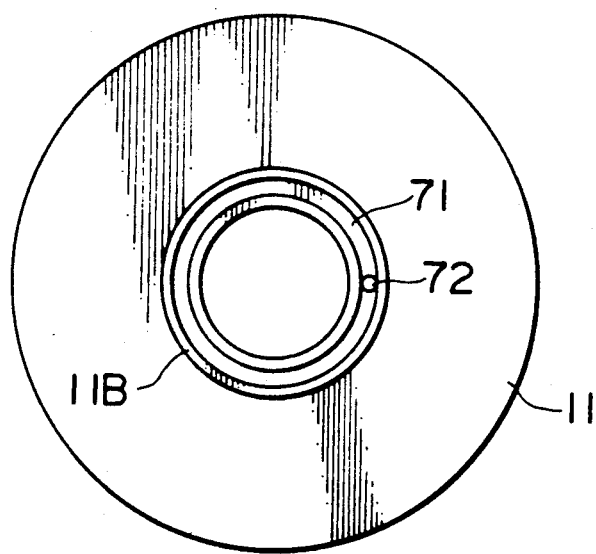
FIG. 24 is a bottom plan view of the second holding unit of the embodiment shown in FIG. 2.

In the embodiment of FIGS. 22-24, the supporting mechanism 2 has a first unit 2X and a second unit 11 supported by the first unit. The first unit 2X has a supporting surface 2A having a fluid suction system and a fluid jetting system which in cooperation form a fluid bearing. The second unit 11 is held by the supporting surface 2A of the first unit in a non-contact manner leaving a clearance 13 therebetween. The second unit 11 has a vacuum system for holding the article 1. In this embodiment, the vacuum supplied to the vacuum system of the second unit 11 is derived from the reduced pressure which is generated by a fluid suction system opening in the holding surface 2A of the first unit 2X. Thus, a vacuum groove 71 of the vacuum system of the second unit 11 communicates through a suction passage 72 in the body of the second unit 11 with the portion of the clearance 13 where a sub-atmospheric pressure is maintained by the operation of the fluid suction system opening in the supporting surface 2A of the first unit 2.

According to this embodiment, the construction is simplified because the necessity for provision of an additional vacuum source for the second unit 11 is eliminated.

Figure 25:
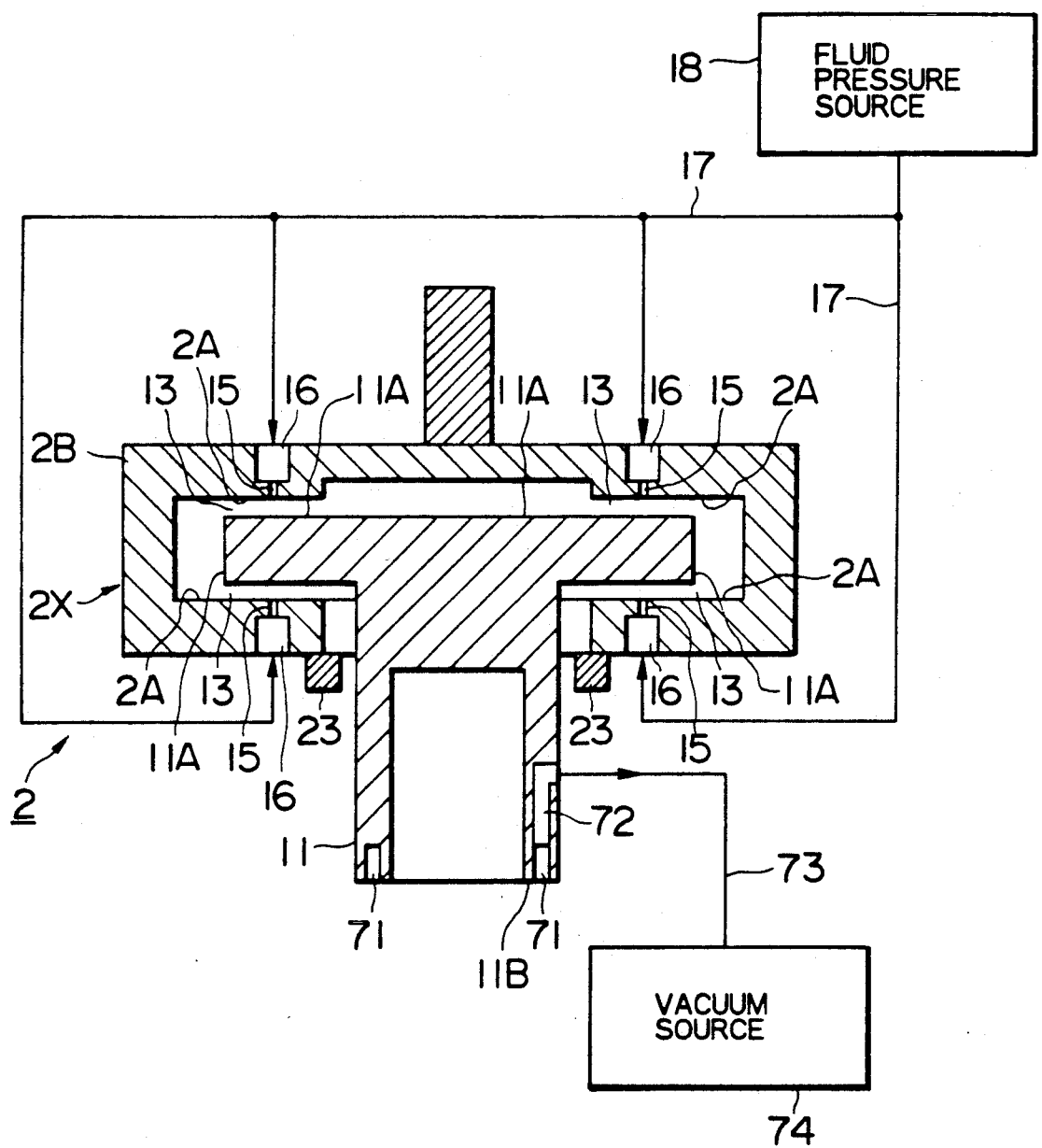
FIG. 25 is an axial sectional view of a still further embodiment of the article assembling device of the present invention in which a supporting mechanism has first and second holding units.

In the embodiment of FIG. 25, the supporting mechanism includes a first unit 2X and a second unit 11 held by the first unit through a fluid bearing. The first unit 2X is provided with a pair of supporting surfaces 2A which oppose each other and which are provided with fluid jetting systems. The second unit 11 has a pair of opposing surfaces 11A which oppose the respective supporting surfaces 2A of the first unit 2X. The second unit 11 is held by the first unit 2X in a non-contacting manner such that bearing clearances 13 are formed between each opposing surface 11A of the second holding unit 11 and the associated supporting surface 2A of the first unit 2X. The fluid jetting systems have orifices 15 which open in the respective supporting surfaces 2A of the first unit 2X and communicating with a pressurized fluid source 18 through fluid supply passages 16 in the first unit 2X and through a conduit 17.

According to this embodiment, the load of the second unit 11 holding the article 1 is borne by the first unit 2X in such a direction as to reduce the clearance 13 between the supporting surface 2A of the first unit 2X and the associated opposing surface 11A of the second unit 11. With this embodiment, therefore, it is possible to correctly fit an article 1 having a comparatively large weight.

Figure 26:
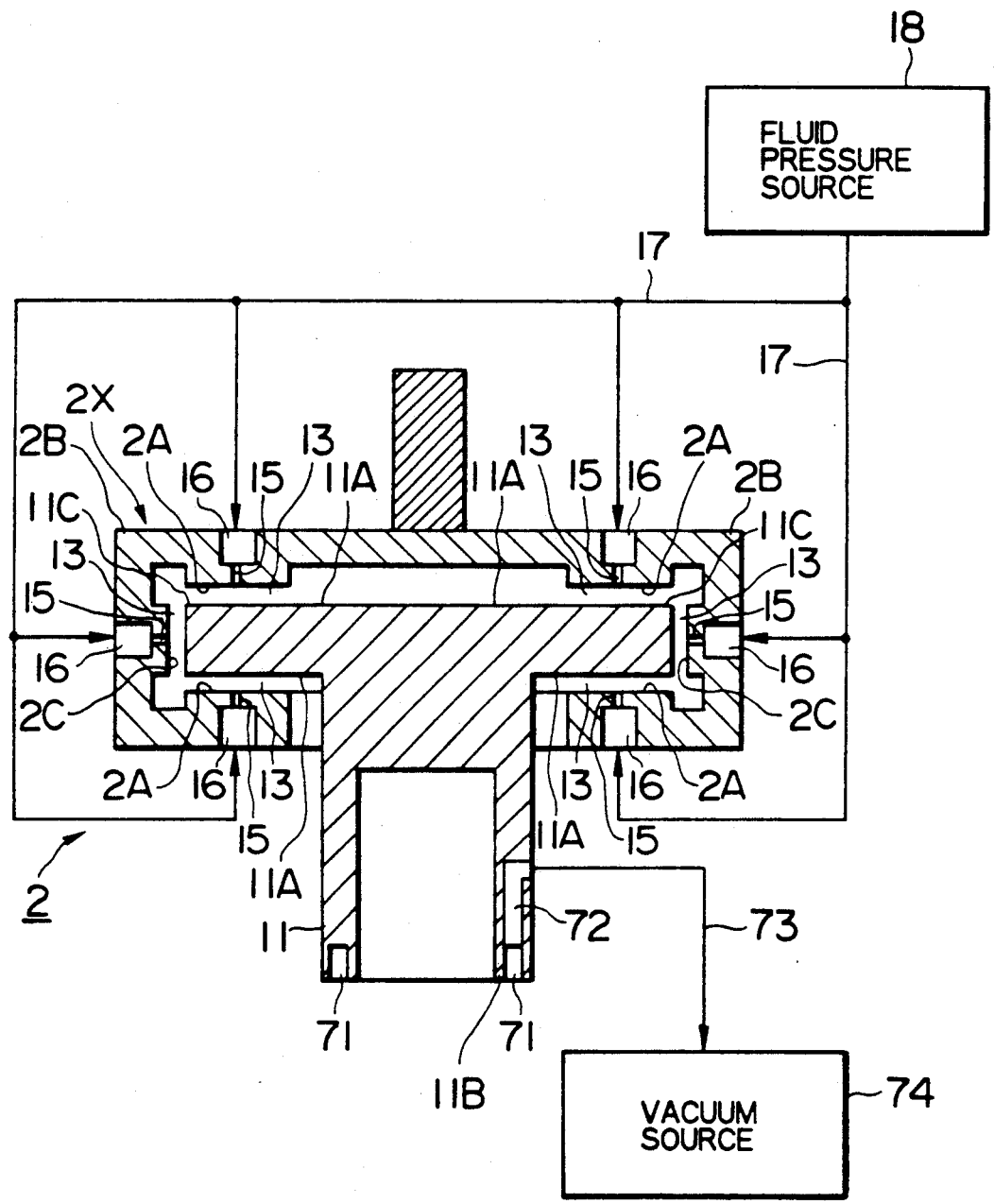
FIG. 26 is an axial sectional view of a still further embodiment of the article assembling device of the present invention in which a supporting mechanism has first and second holding units.

The embodiment of FIG. 26, is similar to the embodiment shown in FIG. 25 but has an additional feature that the first unit 2X is provided with limiting surfaces 2C which extend at certain angles to the planes of the supporting surfaces 2A in order to limit the movement of the second unit 11 along the planes of the supporting surfaces 2A of the first unit 2X in specific directions. The limiting surfaces 2C are provided with fluid discharge systems which have orifices 15 opening in the limiting surfaces 2C and communicated with the pressurized fluid source 18 through fluid supply passages 16 in the first holding unit 2X and through the conduit 17.

In this embodiment, the movement of the second unit 11 along the supporting surfaces 2A relative to the first unit 2X is limited in specific directions. The article 1, therefore, is allowed to move only in predetermined directions along the supporting surfaces 2A. This facilitates fitting of, for example, a polygonal article in a hole having a corresponding polygonal shape.

As will be understood from the foregoing description, according to the present invention, it is possible to fit an article to an object without causing the article to be pressed onto the object, thus eliminating any contamination and damage of the article even if the accuracy of positioning of the article with respect to the object is not high.

What is claimed is:

1. A method of assembling articles together by an article assembling device which includes article positioning means and article supporting means on said article positioning means having an article supporting surface provided with at least one fluid jetting opening formed in said article supporting surface and at least one fluid suctioning groove formed in said article supporting surface and extending around said fluid jetting opening, said method comprising the steps of:

moving, by said article positioning means, said article supporting means to a position above a first article placed in position;

jetting a clean fluid through said at least one fluid jetting opening towards said first article to form a film of fluid thereon and suctioning the fluid through said fluid suctioning groove, to thereby support said first article in closely spaced relationship with said article supporting surface;

moving, by said article positioning means, said article supporting means and said first article supported thereby to a position in which said first article is vertically aligned with said upwardly spaced from a second article;

lowering, by said article positioning means, said article supporting means and said first article until said first article is engaged with said second article and, thereafter, interrupting the jetting of said fluid and the suctioning of said fluid to release said first article from said article supporting surface; and thereafter, lifting said article supporting means.

2. A device for assembling first and second article together, said articles being shaped so as to be engageable with each other, said device comprising:

article positioning means;

means on said article positioning means for movably supporting one of said first and second articles in a non-contacting relationship, said article supporting means being operative to form a fluid film between said article supporting means and said one article supported thereby;

said article positioning means being operative to position the thus supported one article in alignment with the other article;

means for moving at least one of said first and second articles into engagement with the other article; and wherein said article supporting means includes an article supporting surface for defining a space with said one article, means in said article supporting surface for jetting a fluid toward said one article at a first pressure level greater than atmospheric pressure, and means in said article supporting surface for suctioning the fluid from said space to create a zone therein at a second pressure level lower than atmospheric pressure, and wherein said fluid jetting means include at least one fluid jetting opening in said article supporting surface, and said fluid suctioning means include at least one fluid suctioning groove formed in said article supporting surface and extending around said fluid jetting opening.

3. The article assembling device according to claim 2, wherein said article supporting surface includes a plurality of zones arranged circumferentially of said article supporting means and said fluid jetting means and said fluid suctioning means are disposed in each of said zones.

4. The article assembling device according to claim 2, further including additional article supporting means on said article positioning means for supporting, in a non-contacting relationship, a third article to be moved into engagement with said other article substantially simultaneously with said one article, said additional article supporting means including an additional article supporting surface for defining a second substantially planar space with said third article, means in said additional article supporting surface for jetting towards said third article a fluid under a first pressure level higher than atmospheric pressure, and means in said additional article supporting surface for suctioning the fluid from said second space to create therein a second zone at a second pressure level lower than atmospheric pressure.

5. The article assembling device according to claim 4, further including means for forming flows of a fluid between said first and second articles and/or between said second and third articles while said one article and said third articles are moved into engagement with said the other article.

6. The article assembling device according to claim 2, wherein said fluid jetting means further include a fluid supplying groove formed in said article supporting surface and extending around at least a part of said fluid suctioning groove to supply a fluid under pressure higher than the pressure in said fluid suctioning groove.

7. The article assembling device according to claim 2, wherein said one article is movable relative to said article supporting means in a first direction substantially perpendicular to a second direction in which said one article is moved by said article moving means, said article supporting means further includes means for limiting the movement of said one article in said first direction, at least one of said first and second article shaving a guide surface inclined to said second direction to guide the movement of said one article in said second direction, the dimension of said guide surface measured in said first direction being greater than the maximum distance over which said one article can be moved in said first direction.

8. A device for assembling first and second articles together, said articles being shaped so as to be engageable with each other, said device comprising:

a pedestal including article positioning means;

means for movably supporting one of the first and second articles in a non-contacting relationship, said article supporting means being operative to form a fluid film between said article supporting means and the one article supported thereby;

the other article being mounted on said article positioning means;

said article positioning means being operative to position the articles in alignment with each other;

means for moving at least one of said first and second articles into engagement with the other article;

wherein said article supporting means, includes an article supporting surface for defining a space with said one article, means in said article supporting surface for jetting toward said one article a fluid under a pressure level higher than atmospheric pressure, and means in said article supporting surface for suctioning the fluid from said space to create a zone therein at a second pressure level lower than atmospheric pressure, and wherein said fluid jetting means includes at least one fluid jetting opening in said article supporting surface, and said fluid suctioning means includes at least one fluid suctioning groove formed in said article supporting surface and extending around said fluid jetting opening.

9. A device for assembling first and second articles together, said articles being shaped so as to be engageable with each other, said device comprising:

article positioning means;

means on said article positioning means for movably supporting one of the first and second articles in a non-contacting relationship, said article supporting means including means for forming a fluid film between said article supporting means and said one article supported thereby;

said article positioning means being operative to position the thus supported one article in alignment with the other article;

means for moving at least one of said first and second articles into engagement with the other article;

means for forming a flow of a fluid between said first and second articles while said one article is moved into engagement with the other article;

wherein said article supporting means includes an article supporting surface for defining a space with said one article, means in said article supporting surface for jetting towards said one article a fluid under a first pressure level higher than atmospheric pressure, and means in said article supporting surface for suctioning the fluid from said space to create a zone therein at a second pressure level lower than atmospheric pressure, and wherein said fluid jetting means includes at least one fluid jetting opening in said article supporting surface, and said fluid suctioning means includes at least one fluid suctioning groove formed in said article supporting surface and extending around said fluid jetting opening.

10. A device for assembling first and second articles together, said articles being shaped so as to be engageable with each other, said device comprising:

article positioning means;

means for holding one of the first and second articles;

said article holding means including a first portion adapted to hold said one article thereon and a second portion remote from said first portion;

means on said article positioning means for movably supporting said article holding means in a noncontacting relationship, said article supporting means having at least one supporting surface cooperating with said second portion of said article holding means to define a space;

said supporting means including means in said supporting surface for jetting toward said article holding means jets of fluid under a pressure higher than atmospheric pressure;

means on said supporting means for limiting movement of said article holding means along said supporting surface;

said article positioning means being operative to position said one article in alignment with the other article;

means for moving one of said article holding means with said one article held thereon and said second article towards the other to assemble said first and second articles in engagement with each other.

11. The article assembling device according to claim 10, wherein said supporting means further includes means for suctioning the fluid from said space.

12. The article assembling device according to claim 11, wherein said fluid jetting means includes at least one fluid jetting opening in said supporting surface, and said fluid suctioning means includes at least one fluid suctioning groove formed in said supporting surface and extending around said at least one fluid jetting opening.

13. The article assembling device according to claim 10, wherein said supporting means further has an additional supporting surface spaced from the first-said supporting surface and extending substantially parallel thereto, said article holding means having a portion disposed between said supporting surfaces of said supporting means, said supporting means further including additional fluid jetting means in said additional supporting surface for jetting the fluid toward said portion of said article holding means.

14. The article assembling device according to claim 13, wherein said movement limiting means include further fluid jetting means for jetting the fluid to said portion of said article holding means in a direction substantially parallel to said supporting surfaces.

15. A device for mounting a magnetic disc on a spindle of a magnetic disk file assembly, said device comprising:

disc positioning means;

means on said disc positioning means for movably supporting the disc in a non-contacting relationship, said disc supporting means being operative to form a fluid film between said disc supporting means and the disc supported thereby;

said disc positioning means being operative to coaxially position the supported disc relative to the spindle;

means for moving at least one of said disc and said spindle to assemble said disc and said spindle together;

wherein said disc supporting means includes a disc supporting surface for defining a space with said disc, means in said disc supporting surface for jetting a fluid toward said disc under a first pressure level higher than atmospheric pressure, and means in said disc supporting surface for suctioning the fluid from said space to create a zone therein at a second pressure level lower than atmospheric pressure, and wherein said fluid jetting means includes at least one fluid jetting opening in said disc supporting surface, and said fluid suctioning means includes at least one fluid suctioning groove formed in said disc lowering, by said article positioning means, said article supporting means and said first article until said first article is engaged with said second article and, thereafter, interrupting the jetting of said fluid and the suctioning of said fluid to release said first article from said article supporting surface; and thereafter, lifting said article supporting means.

16. The disc mounting device according to claim 15, further including means for supporting a spacer of said magnetic disc file assembly, said spacer being to be mounted on said spindle substantially simultaneously with said disc.

* * * * *